March 31, 1964

E. BOWKER ETAL 3,127,123

TAPE SLITTING MACHINE

Filed Sept. 14, 1962

INVENTORS
ERVIN BOWKER
ERVIN BOWKER, JR.

BY

*Barlow & Barlow*
ATTORNEYS

March 31, 1964 E. BOWKER ETAL 3,127,123
TAPE SLITTING MACHINE
Filed Sept. 14, 1962 3 Sheets-Sheet 2

INVENTORS
ERVIN BOWKER
BY ERVIN BOWKER, JR.

Barlow + Barlow
ATTORNEYS

March 31, 1964     E. BOWKER ETAL     3,127,123
TAPE SLITTING MACHINE

Filed Sept. 14, 1962     3 Sheets-Sheet 3

INVENTORS
ERVIN BOWKER
BY ERVIN BOWKER, JR.

Barlow & Barlow
ATTORNEYS

United States Patent Office 3,127,123
Patented Mar. 31, 1964

3,127,123
TAPE SLITTING MACHINE
Ervin Bowker, 37 Warren Ave., Tiverton, R.I., and Ervin Bowker, Jr., 31 Highland Road, Swansea, Mass.
Filed Sept. 14, 1962, Ser. No. 223,642
2 Claims. (Cl. 242—56.4)

This invention relates to a tape slitting machine and more particularly to a winding and reeling device which has in conjunction therewith a slitting mechanism that will divide a wide roll of tape or other material into narrower rolls.

It is customary in the industry to produce pressure sensitive tape or the like on rather large rolls, and subsequently to divide the width of these rolls to suit the particular applications. Machines have been available in the past for dividing such rolls of tape and these machines have usually taken the form of a supply spindle upon which a roll of wide tape may be placed and then a series of guides over which the tape is passed together with a slitting mechanism is dispersed in the travel of the tape. Usually two or more take-up drums are provided for the slit tape. To initially adjust the supply and take-up drums, it is found that freedom of axial adjustment is quite necessary so that the slitting knives will be properly aligned with the tape to produce the maximum utilization of the tape. Also during the initial setup of the machine the axial adjustment is necessary so that proper spooling will take place between the supply drum and the takeup drums. Machines in the past have been somewhat deficient in the amount of adjustment that can be made in this regard.

Further in slitting tape it is necessary to separate the edges of adjacent slit tapes, and for this purpose guides have to be provided, which guides sometimes take the form of collars on guide rolls or a plurality of fingers that extend between the edges of the slit tape. It will be apparent that with this construction every time the demand for a different width tape occurs, resetting of the guides must be had. This is a time consuming operation, since there is little profit in dividing tapes and sometimes not economically feasible unless a long run is anticipated.

It is accordingly an object of the present invention to improve generally upon tape slitting machines and to provide a machine which may be quickly set up from one width run to another width run.

Another object of the invention is to eliminate entirely the need for edge guides between slit tapes.

A further object of the invention is to control the tension between the feed and take-up rolls to a degree where excessive stretch is not imparted to the tape.

A further object of the invention is to provide adjustment means for axially controlling the position of the supply drum relative to the cutter or slitter head and also to mount the slitting head and the supply drum so that as a unit they may together be adjusted relative to the take-up drums.

With these and other objects in view, the invention consists of certain novel features of construction as will be more fully described and particularly pointed out in the appended claims.

In the accompanying drawings:

FIG. 4 is a perspective illustrating the guiding of tape on the take-up rolls; and FIG. 5 is a perspective view of the slitting device.

In proceeding with this invention, we provide a vertical mounting surface and mount upon this surface for movement relative thereto a second plate. Upon this second plate, there is mounted the supply roll and the first and second feed rolls together with the slitting cutter. Mounted separate from this movable arrangement are two take-up rolls which are arranged in a fashion whereby the lower roll is effectively in a take-up path of the upper roll. A friction drive means is provided for the take-up rolls which engages the periphery of the tape wound thereon and suitable variable speed mechanism is provided for the initial feed rolls to provide the proper tension therebetween.

Figure 1:
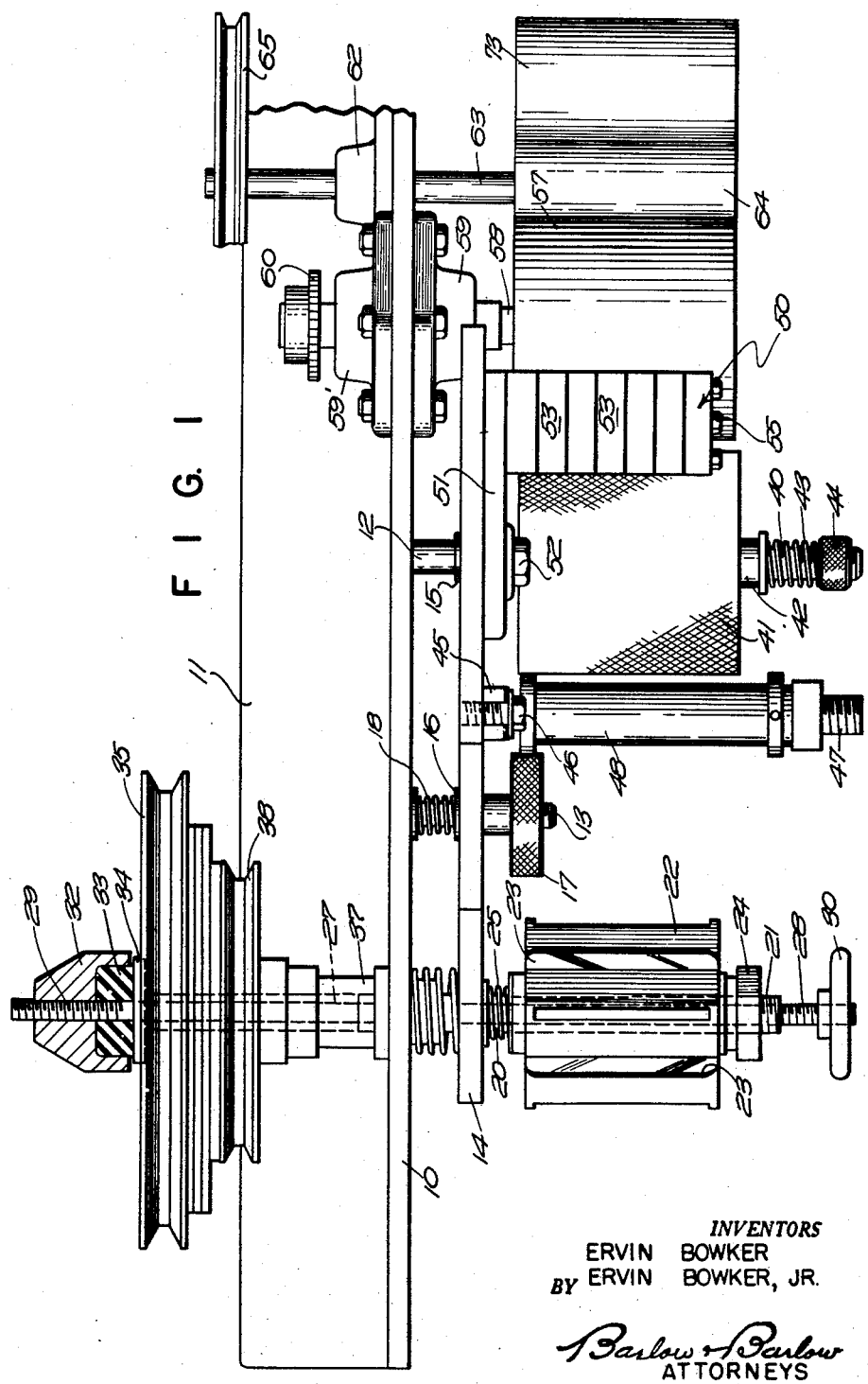
FIG. 1 is a top view of a machine constructed in accordance with the invention.
Figure 2:
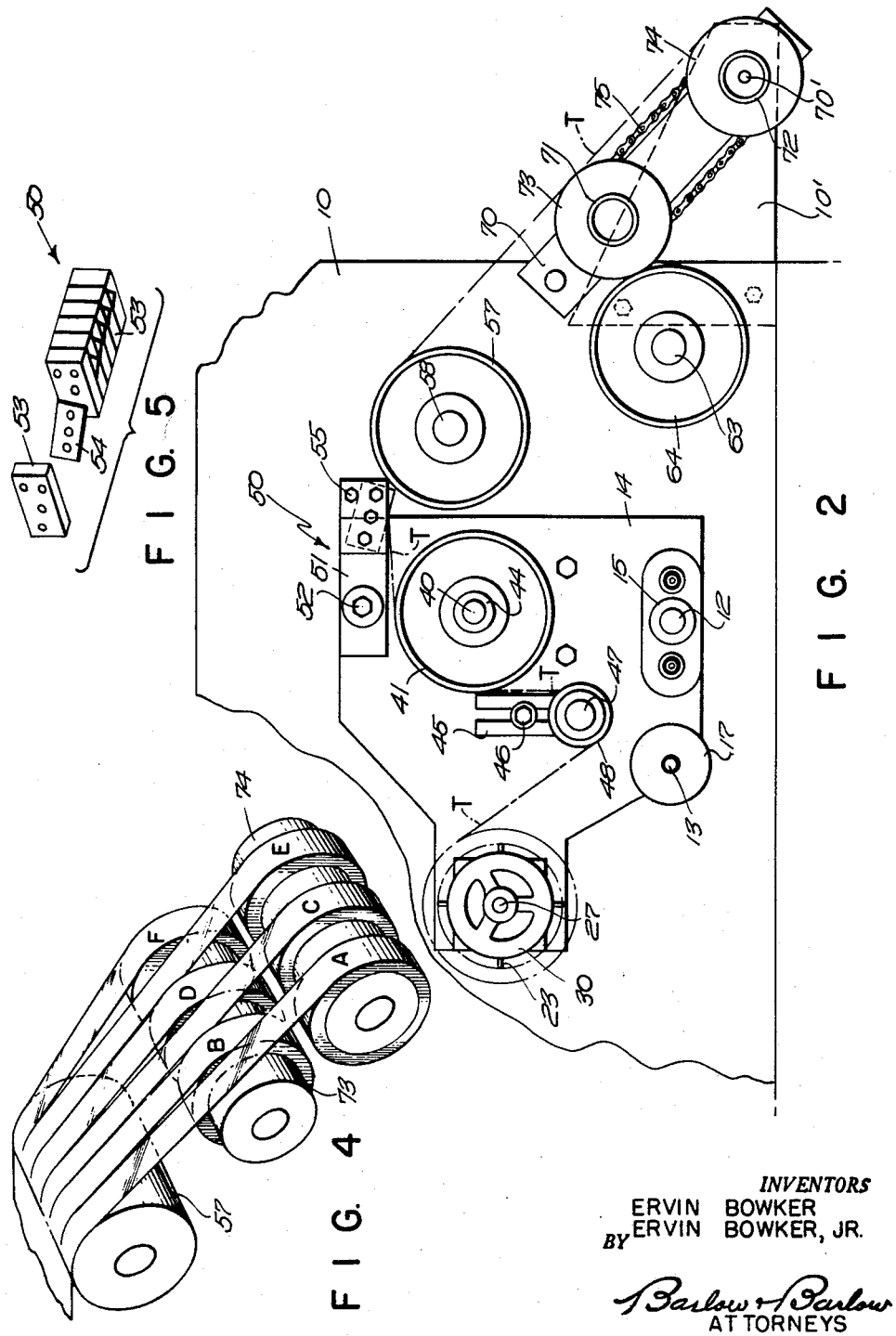
FIG. 2 is a front elevational view thereof.

Referring now to the drawings and particularly FIGS. 1 and 2 thereof, the machine comprises a vertical plate 10 which is provided with a base mounting flange 11 to permit the apparatus to be mounted on a horizontal surface. A pair of stub shafts 12 and 13 extend perpendicular from the vertical surface 10 and upon these posts 12 and 13 there is slidably received a movable plate 14. Bushings 15 and 16 are mounted on the plate 14 to receive the stub shafts 12 and 13 respectively. In order to provide movement of the plate 14 relative to the plate 10, the stub shaft 13 is threaded at its outer end to receive a hand wheel 17 and a compression spring 18 is positioned between the plates 10 and 14 around the shaft 13 to exert a pressure therebetween and against the hub of hand wheel 17.

A cylindrical sleeve 20 is fixed to and extends from the plate 14 and terminates in a threaded end 21. Upon this sleeve there is slidably received a drum 22 having spaced fingers 23 to receive the interior of the core of a roll of tape. This drum 22 is the supply drum and may be moved over the sleeve 20 axially thereof by the fact that a nut 24 is received on the threaded end 21 of the sleeve 20 and will force the drum 22 against a spring 25, the ends of which abut the plate 14 and the drum 22. In this fashion axial adjustment of the drum 22 may be had for purposes which will hereinafter appear.

Passing through the bore of the sleeve 20 is a shaft 27 with a threaded end 28 and a reduced end 29 which is also threaded. Upon the end 28 a hand wheel 30 is fixedly attached while there is received over the threaded end 29 a clutch collar 32 having a clutch face 33 that frictionally engages a face plate 34 mounted on a pulley 35. The shaft 27 is supported while passing through the plate 10 by a bearing 37 and fixedly attached to this shaft 27 is not only the pulley 35 previously referred to but also another pulley 38, this latter pulley being associated with the drive in a speed reduction system which will presently be described.

Extending from the plate 14 is a stub shaft 40 about which there is a revolvably received an idler drum 41. A boss 42 extends from the center of this drum 41 and pressing against this boss is a compression spring 43 urged thereagainst by a thumb nut 44 that is threadingly received on the end of the stub shaft 40. This applies a drag upon the rotation of the drum 41 for a purpose which will hereinafter appear. Mounted upon a bracket 45 which is slidably affixed to the plate 14 as by a cap screw 46 is a shaft 47 which receives a cylindrical collar roll 48 for the purpose of increasing the frictional engagement of tape T around the drum 41.

Also mounted on the plate 14 is a slitter assembly generally designated 50. This slitter assembly 50 consists of an arm 51 pivotally secured to the plate 14 as by a cap screw 52 and having at the free end thereof a plurality of spacer blocks 53 which have sandwiched therebetween cutting elements 54 (see FIG. 5). The spacer blocks 53 are held together by a plurality of cap screws 55 that are threadingly received into the arm 51. By the provision of the spacer blocks 53 of various widths the cutting elements 54 may be spaced apart a desired distance. For instance, if it is desired to slit a large width roll of tape into half-inch widths, the blocks 53 will be made one-half inch thick. The manner in which the cutter is assembled permits easy change of the spacing by merely substituting different thickness blocks and reassembling the blocks and cutters upon the cap screws 55 and thence on to the arm 51.

Adjacent the drum 41 is a feed roller 57. The feed roller 57 is fixedly mounted to a shaft 58 that is received in bearings 59, 59' which bearings are mounted on the support plate 10. The shaft 58 extends through the bearings 59, 59' and has secured to the free end thereof a driving means shown in the form of a sprocket 60.

Mounted in bearings 62 is a shaft 63 that carries a driving drum 64. This driving drum is adapted to be rotated by means of a pulley 65 affixed to the end of the shaft 63 and further means which shall presently be described. The surface of the drum 64 contacts the periphery of the work on the take-up or near roll 73 to drive the take up. The path of travel of the tape from feed roll 57 to take up roll 74 is such that it will be tangent to the take up roll 73 at the start of accumulation of tape on roll 73. Two take-up rolls, one being a roll 73 near the feed roll and the other being a roll 74 distant from the feed roll, are mounted by a bracket 70 which is pivoted at 70' on the extension 10' from the plate 10. This bracket has rotatably received therein two shafts 71 and 72. The near roll 73 and the distant roll 74 are fixed on these shafts respectively for rotary movement therewith. Also to maintain identical rotation of the rolls 73, 74 a sprocket chain drive generally designated 75 may be arranged to couple together the two shafts 71 and 72 so that they rotate together. As indicated in FIG. 4 the divided tape T will be taken up or packaged by one width A leading to distant roll 74 and the next width B being wound on near roll 73, then width C on roll 74, width D on roll 73, width E on roll 74 and width F on roll 73. The widths A, C, E are guided by the packages B, D and F at their edges as build up of these packages occur, the packages being initially separated by blank package cores of requisite width. The bracket connecting the rolls 73, 74 is pivoted about the axis of shaft 72 so that roll 73 and its shaft 71 will rise as the diameters of packages B, D, F increase. Thus packages B, D, F serve as guides for the strip to the packages A, C, E.

Figure 3:
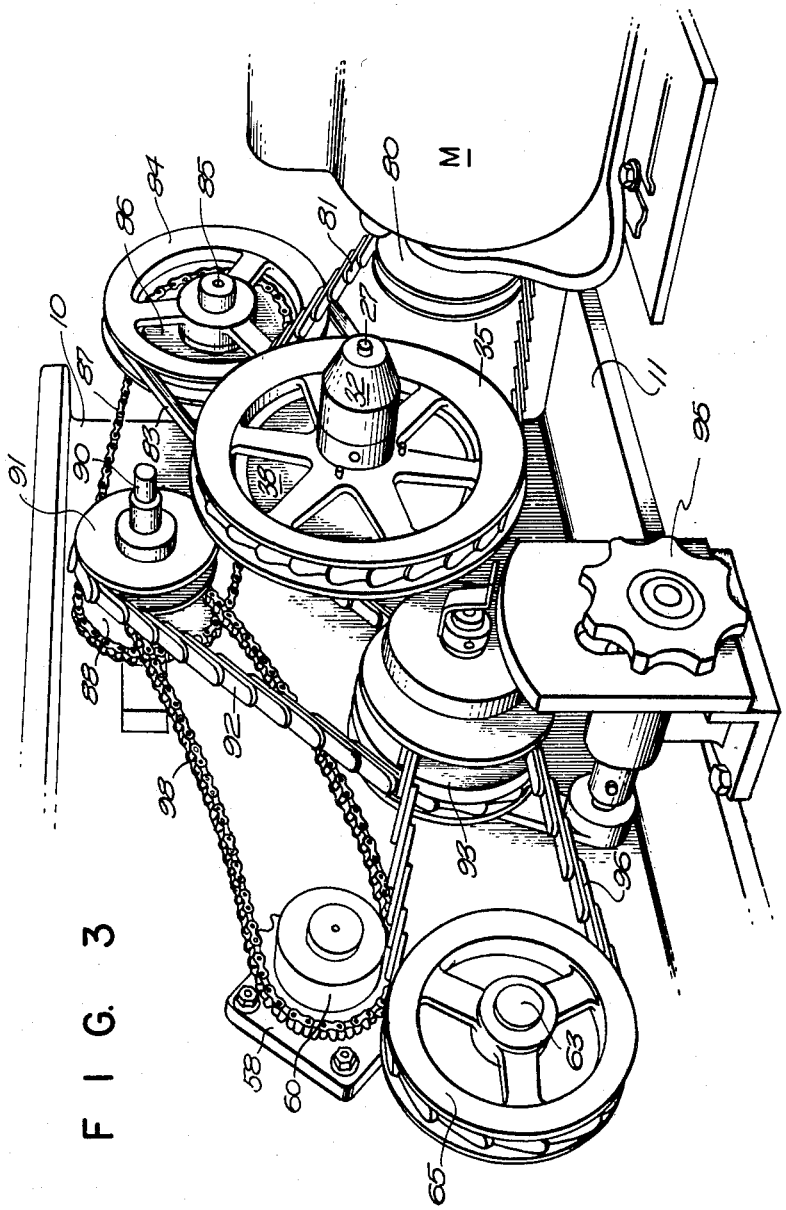
FIG. 3 is a perspective view looking at the drive mechanism for the machine.

To understand how the driving mechanism for the various parts may be arranged, one embodiment thereof is shown on FIG. 3 of the drawings. There are obviously other ways of accomplishing identical results, but this one has proven to be a simple method of achieving the desired result. To this end, a motor M is provided or any other suitable source of motive power having a driving pulley 80 secured to the rotative shaft thereof. A belt 81 engages this pulley 80, which belt 81 also engages in the groove of pulley 35 which is revolvably mounted around the shaft 27. Affixed to the pulley 35 for rotation therewith is a smaller pulley 38 which has a belt 83 in engagement therewith, which belt 83 also is received around an idler pulley 84. Idler pulley 84 is secured to a shaft 85 as is also sprocket 86. The sprocket 86 has a chain 87 in engagement therewith, which chain 87 passes around another sprocket 88 secured to a second idler shaft 90. Also affixed to this second idler shaft 90 is a pulley 91 which receives a belt 92 that passes over a variable speed drive element 93 of the variable pitch diameter variety having a control means generally indicated at 95. The output from the variable pitch diameter device 93 is then carried by means of a belt 96 to a pulley 65 which is received on the shaft 63. Also leading off a second sprocket (not shown) affixed to the shaft 90 is a chain 98 which engages a sprocket 60 mounted on the shaft 58. In this fashion it will be seen that there is present a source of rotation, in the form of a motor which is then transmitted through certain speed reducing devices to be applied first to the supply spindle 27, to the feeding roll 57, and to the take-up drums 73, 74 via the friction drive means 64. From a relative speed standpoint the supply reel 22 rotates at a speed which is less than the speed at which the spindle would have to rotate in order to feed tape therefrom in accordance with the demands of the feed roller 57. In this fashion a drag is produced on the tape as it is drawn from the supply spool, and this insures that the tape stays under tension from the supply spool to the feed roll between which, of course, is located the cutting mechanism. Also in order to maintain tension on the tape as it is delivered from the feed roller 57 to the take-up rolls, the speed of the take-up rolls 73, 74 is slightly faster than that of the speed of the feed roller 57.

Adjustments between these various devices and the source of motive power is had by way of first providing a friction clutch means on the supply roller drive and secondly by providing a variable speed transmission for the take-up drums. In this fashion a constant ratio is thus supplied from the motive source to the feed roller and the other ends of the drive mechanism are then adjusted relative thereto. Since we have a size variation taking place on any winding and reeling device, it will be noted that the friction drive drum 64 for the take-up drums maintains this constant linear relationship since it is always driving the take-up drums by friction with the increasing size of the work at a speed which will yield a constant linear takeup. Thus no undue tensions are imparted to the tape during the processing thereof.

In order to operate the tape slitting mechanism a roll of tape is placed upon the supply drum 22, the tape end is then led under the collar roll 48 and around the idler drum 41 thence under the knife assembly 50 to feed roller 57. When the tape has been led this far, it will become readily apparent whether the slitting is even throughout the width of the tape, and if it is not, then the nut 24 may be rotated giving axial adjustment of the supply roll relative to the cutter assembly 50. The tape which is now in slit form from passing under the cutter assembly 50 may be led from the feed roller 57 to the take-up rollers 73 and 74 upon which there have been placed blank cardboard cores. Each slit end is therefore alternately placed on the cores, slipped over take-up rollers 73 and 74 in the fashion as illustrated in FIGURE 4. The tape in this condition may require some axial adjustment between the cutters 50 and the take-up rolls which may now be effected by moving the entire plate 14 through adjustment of the hand wheel 17. In this fashion the entire axial adjustment of the tape may be had for proper feeding to the take-up rolls 73 and 74. To adjust the tension of the tape as it passes through the machine, the thumb nut 44 may be adjusted to create friction on the idler drum 41 and the speed of the take-up drums 73 and 74 may be adjusted by moving the hand wheel 95, thus further effecting a tension adjustment.

It will thus be seen that we have provided a tape slitting mechanism which may be readily set up for individual runs with great facility and in which the individual slit tape ends are automatically guided to the take-up drums by passing between adjacent rolls being formed.

We claim:

1. A tape slitting mechanism comprising a vertical support, a feeding roller on said support, a unit comprising a generally vertical plate mounted for lateral sliding movement with reference to said support and axially of the roller, said unit including slitting knives and idler drums over which a web of work passes and a supply drum for the work, all carried by said plate, and means for adjusting said plate axially of the roller comprising a spring urging said plate away from said support and a screw and nut acting against said spring to adjust said plate relative to said support.

2. A take-up means for a tape slitting mechanism comprising a bracket, a pair of take-up rolls mounted on parallel axes on said bracket, one of said rolls being a near roll and the other roll being a distant roll over which the work travels, the near roll for reeling spaced widths of tape and the distant roll for reeling widths of tape alternating with the tape reeled on the near roll, a feed roll over which the tape travels to both rolls and the surface of the near roll being substantially tangent to the path of travel of the tape from the feed roll to the distant roll prior to assembly of work thereon, means to pivot the bracket about the axis of the distant roll so that the reeled tape on the near roll will guide the tape reeled on the distant roll.

References Cited in the file of this patent
UNITED STATES PATENTS

| | | |
|---|---|---|
| 1,095,661 | Moulton | May 5, 1914 |
| 1,652,552 | Ernst | Dec. 13, 1927 |
| 2,414,739 | Heygel | Jan. 21, 1947 |
| 2,454,003 | Pamphilon | Nov. 16, 1948 |
| 2,526,029 | Judelson | Oct. 17, 1950 |